May 24, 1949.  H. J. LESSER  2,470,995

FISHLINE SINKER

Filed March 4, 1946

INVENTOR.
Henry J. Lesser
BY Fred C. Matheny
ATTORNEY

Patented May 24, 1949

2,470,995

UNITED STATES PATENT OFFICE 2,470,995

FISHLINE SINKER

Henry J. Lesser, Seattle, Wash.

Application March 4, 1946, Serial No. 651,684

2 Claims. (Cl. 43—52)

1

This invention relates to a fish line sinker of a type known as a "slip sinker."

An object of this invention is to provide novel and efficient means for fastening a sinker to a fish line in such a manner that the sinker may quickly and easily be attached to or detached from the fish line without requiring an end portion of the line to be threaded through the means by which the sinker is fastened to the line.

Another object is to provide a sinker of novel shape which, when it is drawn through the water, will react against the water in such a manner as to cause it to sink to a greater depth in the water than will a sinker of the same weight and of ordinary conventional shape when used under the same conditions.

Another object is to provide a sinker having two bail shaped members of substantial length positioned close together and extending along one side of the sinker body and cooperating to receive a fish line and removably secure the sinker to the line without requiring an end of the line to be threaded through any part of the securing means.

Other objects of the invention will be apparent from the following description taken in connection with the accompanying drawings.

In the drawings Figure 1 is a top plan view of a fish line sinker constructed in accordance with this invention, showing a fragment of a fish line to which the sinker is attached.

Like reference numerals designate like parts throughout the several views.

Figure 1:
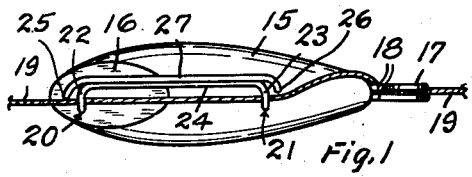
Figure 4:
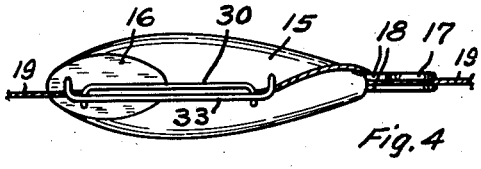
Fig. 4 is a top plan view of a modified form of sinker constructed in accordance with my invention, showing the same attached to a line.
Figure 2:
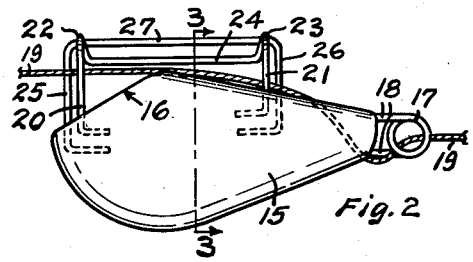
Fig. 2 is a side elevation of the same.
Figure 5:
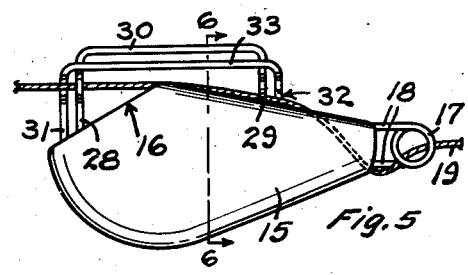
Fig. 5 is a side elevation of the sinker shown in Fig. 4.
Figure 3:
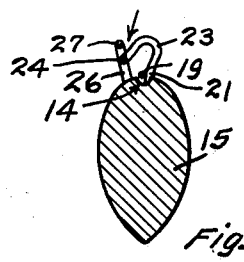
Fig. 3 is a cross sectional view taken substantially on broken line 3—3 of Fig. 2.
Figure 6:
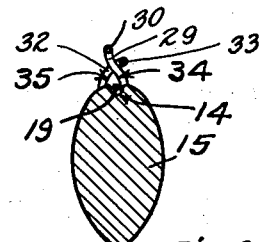
Fig. 6 is a view in cross section taken substantially on broken line 6—6 of Fig. 5.

Referring to Figs. 1 to 3 inclusive 15 is a sinker

2 body of oval cross section, as shown in Fig. 3. In side elevation the sinker body 15 is shaped somewhat like a pear except that it has an inclined flat or plane surface 16 on the upper side of its larger forward end. The smaller end of the sinker body is the rear or trailing end when the sinker is drawn through the water in trolling.

Preferably the sinker body is of one piece construction and may be made from lead or lead alloy by a process of molding.

The inclined flat surface 16 on the forward end portion of the sinker body 15 reacts against the water when the sinker is drawn, larger end foremost, through the water and causes the sinker to troll at a greater depth than will a sinker of the same weight operating under similar conditions, but which does not have the inclined flat surface 16.

A friction clip 17 of well known form, preferably comprising about one and one-half turns of spring wire, is rigidly secured to the smaller rear end portion of the sinker body as by embedding the end portions 18 of said clip in the sinker body. This resilient friction clip 17 is adapted to receive a fish line 19 and frictionally hold said line in such a manner that the line can be pulled loose from the clip by the pull of a fish when the fish strikes. Preferably the line 19 is made fast in the spring clip 17 by passing said line partially around the rear end portion of the sinker body and drawing said line into the spring clip 17 from below as shown in Figs. 1 and 2. Care must be taken to pass the line around the side of the sinker body which will compel the operator to draw the line under the lowermost member 18 of the spring clip 17 before said line can be drawn upwardly between the coils of said spring clip. If the line is drawn around the other side of the sinker body it may possibly become fouled in the spring clip.

Preferably a longitudinal groove 14, Fig. 3, is provided in the upper portion of the sinker body to better guide and hold the line 19.

Two bail shaped line engaging members are provided on the sinker body for receiving and guiding the line 19. One of these bail shaped members comprises two spaced apart arms 20 and 21 embedded in and protruding from the sinker body 15 and bent sidewise in the same direction and toward the sinker body to form hook shaped portions 22 and 23, said hook shaped portions being connected by an integral bar portion 24. The bar portion 24 is substantially parallel with and slightly spaced from the sinker body. The other bail shaped line engaging member comprises two arm portions 25 and 26 rigid with and protruding from the sinker body 15 and connected by a bar portion 27. The bar portion 27 is positioned substantially parallel with and a short distance above the bar portion 24 and said bar portion 27 extends across the hook members 22 and 23 and either contacts said hook members 22 and 23 or is positioned so close to said hook members 22 and 23 that it will have to be sprung away from said hook members slightly to allow the fish line 19 to pass between it and the hook members.

Any portion of a fish line 19 remote from the ends thereof can quickly and easily be engaged with the sinker of Figs. 1, 2 and 3 by pulling said line downwardly in the direction of the arrow in Fig. 3, between the bar 27 and each loop 22 and 23. This operation can be made easier by first poking a loop of the line 19, from right to left, Fig. 3, through the space between the two bars and then pulling said line first between one hook member and the bar 27 and then between the other hook member and the bar 27. In a similar manner any portion of the line remote from the ends thereof can be quickly and easily removed from the hook members 22 and 23 by drawing a loop of the line 19 to the left, Fig. 3, out of the hook members 22 and 23 and then pulling said line out between the hook members 22 and 23 and the bar 27. Thus the sinker may be engaged with or disengaged from the line quickly and easily without poking or threading an end of the line through any perforations or eyes or line engaging means. This makes it possible to attach and detach this sinker without removing hooks, leaders and the like from the end of the line. This is highly desirable in salmon trolling and like fishing where sinkers are frequently changed.

When a sinker 15 is attached to a line 19 as shown in Figs. 1 and 2 and drawn through the water with the large end of the sinker body foremost, the water will react against the flat surface 16 and cause the sinker body to sink to a greater depth in the water than it would in the absence of this flat surface.

Figs. 4 to 7 show a modified form of the invention in which the sinker body 15 and spring clip 17 are the same as those shown in Figs. 1 to 3 but the line engaging means is somewhat modified.

The line engaging means of Figs. 4 to 7 includes two bail shaped line engaging members. One of said line engaging members comprises two spaced apart end pieces or arms 28 and 29 that are fixedly embedded in the sinker body 15 and protrude therefrom and are connected with each other by an integral bar member 30. The other line engaging member comprises two spaced apart end pieces or arms 31 and 32 that are embedded in the sinker and protrude therefrom and are connected with each other by an integral bar member 33. The bar member 33 is slightly longer than the bar member 30 and the two bar members 33 and 30 are positioned close together with the bar member 33 extending past and engaging the end pieces or arms 28 and 29 of the bar member 30. The two end pieces or arms 28 and 31 are positioned near the forward end of the sinker body and the two end pieces or arms 29 and 32 are positioned toward the smaller rear end portion of the sinker body. The end pieces or arms 29 and 32 are bent outwardly, Fig. 6, to form opposed loops 34 and 35 for receiving and guiding a fish line 19. The end pieces or arms 28 and 31 are similarly bent to provide opposed loops as indicated by shading in Fig. 5.

The sinker shown in Figs. 4 to 7 may be engaged with a fish line without poking an end of the line through the line holding means. This is done by passing a looped portion L of the line 19, from the side of the sinker toward the observer Fig. 7, through the opening between the bar 33 and the sinker body, thence poking said loop back toward the observer through the opening between the two bars 30 and 33 then pulling on the line until portions P of said line pass between the arm members 28 and 29 and the bar 33 and leave the line extending through the loop portions 34 and 35 of arms 29 and 32 and the corresponding loop portions of arms 28 and 31.

To disengage the line 19 from the line engaging means of Figs. 4, 5, 6 and 7 the portion of the line between the arms 31 and 32 is raised over the bar 30 so that it extends along the top of the bar 33 and a pull is exerted on the line beyond each end of the sinker body to pull said line outwardly from between the bar 33 and the arm portions 28 and 29. It is to be noted that the bar 33 is close enough to the arm portions 28 and 29 so that these parts will have to be sprung apart in passing the line 19 therebetween.

Figure 8:
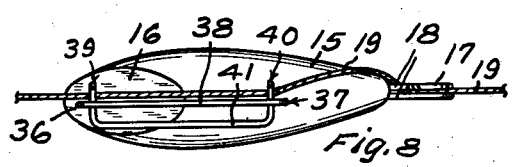
Fig. 8 is a top plan view of another modified form of sinker.
Figure 7:
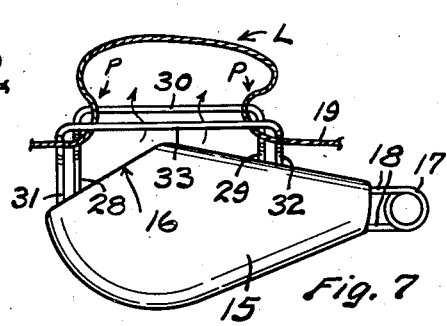
Fig. 7 is a side elevation of the sinker shown in Figs. 4, 5 and 6, illustrating a step in the process of engaging a fish line with said sinker.
Figure 9:
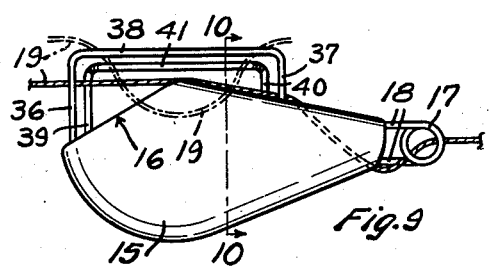
Fig 9 is a side elevation of the sinker shown in Fig. 8.
Figure 10:
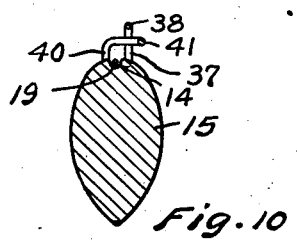
Fig. 10 is a view in cross section taken substantially on line 10—10 of Fig. 9.

Figs. 8, 9 and 10 show another modified form of the invention in which the sinker body 15 and spring clip 17 are the same as those previously described but line engaging means of still another modified form is used. This line engaging means consists of two bail shaped members that extend lengthwise of the sinker body 15. One of these bail shaped members comprises two spaced apart end pieces or arms 36 and 37 that are rigidly embedded in the sinker body and protrude therefrom and are connected by an integral bar member 38. The other line engaging member comprises two end pieces or arms 39 and 40 embedded in the sinker body and protruding therefrom and connected by a bar member 41. The end members 39 and 40 are spaced apart a less distance than the end members 36 and 37 and are positioned between and slightly to one side of the end members 36 and 37 and are bent toward and extend under the bar 38. Thus the end members 39 and 40 are embedded in the sinker body at one side of the line engaging member 36, 37, 38 and extend under the bar 38 and bar 41 is positioned at the other side of said line engaging member 36, 37, 38.

A line 19 is engaged with the sinker shown in Figs. 8, 9 and 10 by poking a loop of the line under the bar 38 and over the bar 41, as shown by dot and dash lines in Fig. 9, and then drawing said line between the end members 36 and 39 the end members 37 and 40 into the position shown by full lines in Figs. 8, 9 and 10.

To disengage the line 19 from the sinker of Figs. 8, 9 and 10 the portion of the line lying between end members 36 and 37 is pulled outwardly in the direction of the bar 41 and is then looped up over the bar 41 and a pull is exerted on the line outwardly from the end portions 36, 39 and 37, 40 to pull the line clear of the line engaging means.

The construction of all three types of the invention herein disclosed is similar in that each form thereof has two bail shaped line engaging members, one longer than the other with the end bars of these bail shaped members embedded in the sinker body 16 and parts of the shorter bail shaped member extending under the longitudinal bar of the longer member. In each instance the bail shaped members cooperate to detachably engage with a fish line without requiring the end of the line to be threaded through any part of the bail members.

In the sinker of Figs. 1, 2 and 3 the end members of the shorter bail shaped member are bent in the shape of hooks to receive the line. In the sinker of Figs. 4 to 7 the end members of the two bail shaped members are bent outwardly away from each other to receive the line and the end members at each end are relatively crossed. In the sinker of Figs. 8, 9 and 10 the end members of the shorter bail shaped member are of inverted L shape and extend crosswise under the bar of the longer bail shaped member.

Obviously changes may be made in this sinker within the scope of the claims.

I claim:

1. In a fish line sinker, a sinker body; a resilient friction clip secured to an end portion of said sinker body adapted to frictionally and releasably grip a fish line; and two bail shaped fish line engaging members carried by said sinker body and extending longitudinally thereof, each fish line engaging member comprising two spaced apart end members embedded in said sinker body and protruding therefrom and a substantially straight bar portion connecting said two end members, the end members of one bail shaped member being spaced a short distance inwardly from the end members of the other bail shaped member and the bar portions of said two bail shaped members being positioned relatively close together in substantially parallel relation with both bar portions spaced a substantial distance from the sinker body and with one bar portion closer to the sinker body than the other and with the bar portion of the shorter bail shaped member extending longitudinally of the sinker body substantially between the sinker body and the bar portion of the longer bail shaped member, said bail shaped members being adapted to receive therebetween a portion of a fish line remote from the ends thereof to removably engage the sinker body with the fish line.

2. In a fish line sinker, a sinker body; a resilient friction clip secured to an end portion of said sinker body adapted to frictionally and releasably grip a fish line; and two bail shaped fish line engaging members carried by said sinker body and extending longitudinally thereof, each fish line engaging member comprising two spaced apart end members embedded in said sinker body and protruding therefrom and a substantially straight bar portion connecting said two end members, the end members of one bail shaped member being spaced a short distance inwardly from the end members of the other bail shaped member and being shaped like hooks with the bar portion thereof extending between the tips of the hooks and being positioned substantially parallel with and close to the other bar portion and between the sinker body and said other bar portion, said bail shaped members being adapted to receive therebetween a portion of a fish line remote from the ends thereof to removably engage the sinker body with the fish line.

HENRY J. LESSER.

REFERENCES CITED

The following references are of record in the file of this patent:

UNITED STATES PATENTS

| Number | Name | Date |
|---|---|---|
| 2,115,302 | Chochard | Apr. 26, 1938 |
| 2,201,082 | Dobbins et al. | May 14, 1940 |
| 2,257,415 | Gerdin | Sept. 30, 1941 |
| 2,293,800 | Brown | Aug. 25, 1942 |